United States Patent
Badrinarayanan et al.

(10) Patent No.: US 9,768,455 B2
(45) Date of Patent: Sep. 19, 2017

(54) FUEL CELL DEVICE HAVING A LIQUID SOAK UP REGION

(75) Inventors: Paravastu Badrinarayanan, Manchester, CT (US); Timothy W. Patterson, West Hartford, CT (US)

(73) Assignee: Audi AG, Ingolstadt (DE)

( * ) Notice: Subject to any disclaimer, the term of this patent is extended or adjusted under 35 U.S.C. 154(b) by 1609 days.

(21) Appl. No.: 13/003,775

(22) PCT Filed: Sep. 12, 2008

(86) PCT No.: PCT/US2008/076096
§ 371 (c)(1),
(2), (4) Date: Jan. 12, 2011

(87) PCT Pub. No.: WO2010/030278
PCT Pub. Date: Mar. 18, 2010

(65) Prior Publication Data
US 2011/0129747 A1 Jun. 2, 2011

(51) Int. Cl.
*H01M 8/04223* (2016.01)
*H01M 8/0241* (2016.01)
*H01M 8/04119* (2016.01)
H01M 8/0204 (2016.01)
H01M 8/0234 (2016.01)
H01M 8/0239 (2016.01)
H01M 8/1018 (2016.01)

(52) U.S. Cl.
CPC ..... *H01M 8/04223* (2013.01); *H01M 8/0241* (2013.01); *H01M 8/04171* (2013.01); *H01M 8/04253* (2013.01); H01M 8/0204 (2013.01); H01M 8/0234 (2013.01); H01M 8/0239 (2013.01); H01M 8/04179 (2013.01); H01M 2008/1095 (2013.01)

(58) Field of Classification Search
CPC ........... H01M 8/0429; H01M 8/04171; H01M 8/1002; H01M 8/1206
USPC ................................ 429/414, 450, 429, 483
See application file for complete search history.

(56) References Cited

U.S. PATENT DOCUMENTS

| | | | |
|---|---|---|---|
| 5,660,048 A | 8/1997 | Belding | |
| 6,492,044 B1* | 12/2002 | Walsh | H01M 8/04171 429/457 |
| 2005/0181264 A1* | 8/2005 | Gu | C22C 29/00 429/414 |
| 2006/0040150 A1 | 2/2006 | Yu et al. | |
| 2007/0269709 A1* | 11/2007 | Mitsuta | H01M 8/023 429/483 |

OTHER PUBLICATIONS

International Preliminary Report on Patentability, dated Mar. 24, 2011, PCT/US2008/076096.

* cited by examiner

*Primary Examiner* — Ula C Ruddock
*Assistant Examiner* — Thomas Parsons
(74) *Attorney, Agent, or Firm* — Seed IP Law Group LLP

(57) ABSTRACT

The fuel cell device includes an electrode assembly. A gas diffusion layer is on each side of the electrode assembly. A solid, non-porous plate is adjacent each of the gas diffusion layers. A hydrophilic soak up region is near an inlet portion of at least one of the gas diffusion layers. The hydrophilic soak up region is configured to absorb liquid water from the electrode assembly when the fuel cell device is shutdown.

22 Claims, 2 Drawing Sheets

FUEL CELL DEVICE HAVING A LIQUID SOAK UP REGION

BACKGROUND

Fuel cells are useful for generating electrical power. An electrochemical reaction occurs at a proton exchange membrane. Flow field plates are provided on each side of the membrane to carry reactants such as hydrogen and oxygen to the membrane for purposes of generating the electrical power. The flow field plates in some examples are solid, non-porous plates. Other example fuel cell arrangements include porous plates. There are advantages and drawbacks associated with each type of arrangement.

In solid plate fuel cell arrangements, for example, it is necessary to perform a flow field purge at shutdown to remove liquid water from the flow field channels. During the electrochemical reaction, liquid water is produced as a byproduct and tends to collect in the flow fields on the cathode side. If that liquid water remains there and temperatures drop sufficiently low, it will freeze and interfere with the ability to start up the fuel cell after it has been shutdown.

Typical purge procedures include using an air blower and a hydrogen recycle blower to remove the liquid water. One disadvantage of using such a purge procedure is that it introduces relatively large parasitic loads on the system when the fuel cell is no longer producing electrical power. Other issues associated with usual purge procedures are added system complexities and the risk of drying out portions of the fuel cell stack.

There is a need for a water management arrangement and strategy that reduces or eliminates purge requirements.

SUMMARY

An exemplary fuel cell device includes an electrode assembly. A gas diffusion layer is on each side of the electrode assembly. A solid, non-porous plate is adjacent each of the gas diffusion layers. A hydrophilic soak up region is near an inlet portion of at least one of the gas diffusion layers. The hydrophilic soak up region is configured to absorb liquid water from the electrode assembly when the fuel cell device is shutdown.

In a fuel cell device having an electrode assembly, a gas diffusion layer on each side of the electrode assembly and a solid, non-porous plate adjacent each of the gas diffusion layers, an exemplary method of managing liquid distribution within the fuel cell includes providing a hydrophilic soak up region near an inlet portion of at least one of the gas diffusion layers. Liquid water is absorbed into the hydrophilic soak up region from the electrode assembly when the fuel cell device is shutdown.

The various features and advantages of this invention will become apparent to those skilled in the art from the following detailed description. The drawings that accompany the detailed description can be briefly described as follows.

DETAILED DESCRIPTION

Figure 1:
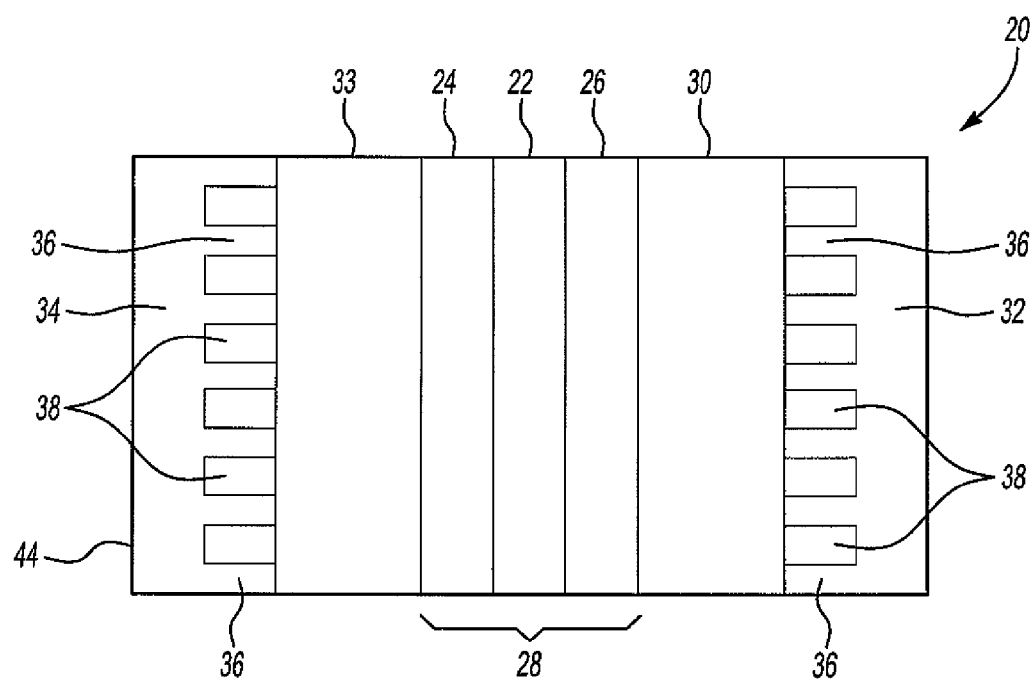
FIG. 1 schematically shows selected portions of an example fuel cell device.

FIG. 1 schematically shows selected portions of a fuel cell device 20. A proton exchange membrane 22 is positioned between catalyst layers 24 and 26. One of the catalyst layers 24 or 26 is a cathode catalyst layer while the other is an anode catalyst layer. The membrane 22 and the catalyst layers 24 and 26 are collectively referred to as an electrode assembly 28. The electrochemical reaction for producing electrical power within the fuel cell device 20 occurs at the electrode assembly 28.

A first gas diffusion layer 30 is positioned against the catalyst layer 26. The gas diffusion layer 30 in one example is hydrophobic. In another example, the gas diffusion layer 30 is hydrophilic. A first flow field plate 32 is positioned adjacent the gas diffusion layer 30.

Another gas diffusion layer 33 is positioned adjacent the catalyst layer 24. In one example, the gas diffusion layer 33 is hydrophobic. In another example, the gas diffusion layer 33 is hydrophilic. A second flow field plate 34 is positioned adjacent the gas diffusion layer 33.

In this example, the flow field plates 32 and 34 comprise solid, non-porous plates.

Figure 2:
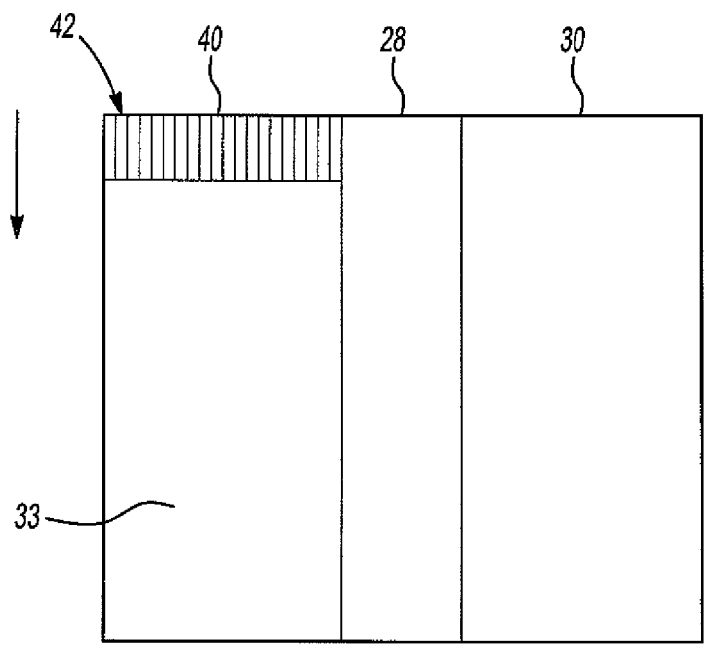
FIG. 2 schematically shows selected features of selected portions of the example of FIG. 1.

FIG. 2 schematically shows a hydrophilic soak up region 40 near an inlet portion 42 of the gas diffusion layer 33. During normal fuel cell operating conditions, the soak up region 40 remains essentially dry as dry gases are introduced to the fuel cell.

The soak up region 40 in one example is in an electrochemically inactive region of the gas diffusion layer 33. In another example, the soak up region 40 is at least partially in an electrochemically active region.

Figure 3:
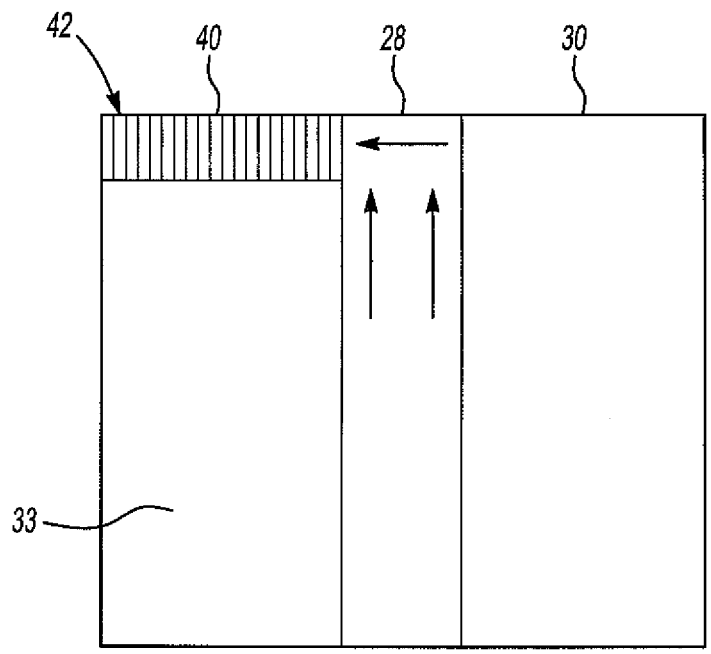
FIG. 3 shows the example of FIG. 2 in another operating condition.

Upon shutdown of the fuel cell device, the gas flow stops. There is liquid water byproduct present within the fuel cell device. At least some of that liquid water flows as schematically shown by the arrows 44 in FIG. 3 across the electrode assembly 28 and into the soak up region 40. The arrows 44 are intended to show in-plane and through (or cross)—plane liquid water movement across the electrode assembly 28. The water that is absorbed by the soak up region 40 may come from the flow field channels 38, the catalyst layers, the catalyst-bi-layer interface and the macro porous layer within the fuel cell device. The soak up region 40 allows for drawing water away from the electrode assembly so that if any such water were to freeze, it will not interfere with reactants reaching the electrode assembly during a subsequent start up of the device.

In one example, a hydrophilic material or treatment is applied or added to the gas diffusion layer 33 in the region 40. Example hydrophilic materials include carbon, nafion and a wettable polymer. The hydrophilic treatment can include materials such as carbon, either naturally hydrophilic or rendered hydrophilic with treatments such as metal oxides, and polymers that can absorb water such as nafion. In such examples, the chemical properties of the absorbing material tends to draw water into the soak up region 40.

The gas diffusion layer 33 is porous. In one example, the hydrophilic material fills at least some of the pores in the region 40.

In another example, the soak up region 40 is established by controlling pore sizes in the corresponding gas diffusion layer 33. For example, configuring a hydrophilic gas diffusion layer 33 with larger pores outside of the soak up region 40 and smaller pores within the soak up region 40 will cause water to move toward the soak up region 40. The smaller pore size tends to draw in water because of the capillary dynamics associated with them. As known, smaller sized pores introduce larger capillary forces that tend to draw liquid into such pores more so than a comparatively larger pore.

One way of achieving smaller pores includes treating the soak up region 40 with hydrophilic carbon to establish smaller pores. At least some of the pores in the soak up region 40 are smaller in such an example. It is not necessary for all pores in the soak up region 40 to be smaller than other pores in the adjacent catalyst layer or a remainder of the gas diffusion layer. Some of the pores in one example soak up region 40 are the same size as other pores outside of that region.

The example soak up region 40 includes a plurality of pores. The catalyst layer 24 includes a plurality of pores. The pores of the soak up region 40 have a first size and the pores of the catalyst layer have a second pore size. The second pore size is at least as large as the pore size of the soak up region 40. In this example, the second pore size is larger such that the pores in the soak up region 40 are smaller than the pores of the catalyst layer 24. Having smaller pore size in the soak up region 40 compared to those in the catalyst layer 24 facilitates drawing water into the soak up region 40. Providing the smaller pores facilitates absorbing water into the soak up region 40 and using the soak up region 40 as a reservoir for the water.

In one example, the gas diffusion layer 33 is on the anode side of the fuel cell device. Positioning the soak up region 40 on the anode side facilitates removing water from the cathode side, which is where byproduct liquid water tends to collect during fuel cell operation. Using the soak up region 40 for removing at least some of the water from the cathode side flow field channels and from the electrode assembly 28 is useful for avoiding difficulties with subsequently starting the fuel cell device in low temperature conditions.

Another example includes a soak up region 40 on a cathode side. In such an example, the soak up region 40 is positioned to draw water away from the electrode assembly 28.

Figure 4:
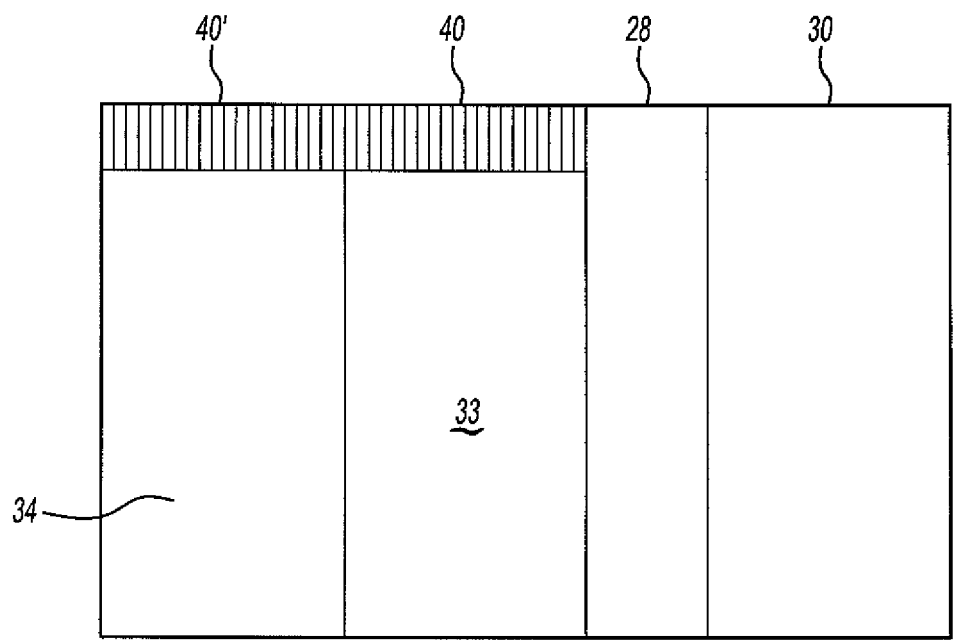
FIG. 4 shows selected portions of another example fuel cell device configuration.

The example of FIG. 4 includes a soak up region 40 in the gas diffusion layer 33. This example also includes a soak up region 40' in the adjacent flow field plate 34 near the fuel inlet on the corresponding side of the fuel cell device. Providing an additional area of soak up region 40' in the flow field plate 34 adjacent the gas diffusion layer 33 provides additional water retention capability away from the areas in the fuel cell device where frozen water could present difficulty during a start up under cold conditions.

One feature of the disclosed examples is that a purge procedure can be minimized or eliminated, which simplifies a shutdown procedure and enhances the economies of the fuel cell arrangement. In some examples, some purge procedure may be used in combination with the soak up region 40 for purposes of managing the distribution of liquid water within the fuel cell during shutdown. For example, some dry gas is introduced into the flow field channels on the cathode side but in a lesser amount or for a shorter time compared to previous purge cycles. In other examples, no purge procedure is needed.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A fuel cell device, comprising:
an electrode assembly;
a first gas diffusion layer on a first side of the electrode assembly;
a second gas diffusion layer on a second side of the electrode assembly;
a first solid, non-porous plate adjacent the first gas diffusion layer;
a second solid, non-porous plate adjacent the second gas diffusion layer; and
a hydrophilic soak up region located within the first gas diffusion layer and within the first solid, non-porous plate, the hydrophilic soak up region near an inlet portion of the first gas diffusion layer, the hydrophilic soak up region contacting the electrode assembly and configured to absorb liquid water directly from the electrode assembly when the fuel cell device is shut down.

2. The fuel cell device of claim 1, wherein the hydrophilic soak up region is on an anode side of the electrode assembly.

3. The fuel cell device of claim 2, including the hydrophilic soak up region near an inlet portion of the first solid, non-porous plate on the anode side of the electrode assembly.

4. The fuel cell device of claim 1, wherein the hydrophilic soak up region is at least partially within an electrochemically inactive area of the first gas diffusion layer.

5. The fuel cell device of claim 1, wherein the hydrophilic soak up region has pores of a first size and the electrode assembly includes a catalyst layer immediately adjacent the first gas diffusion layer, the catalyst layer is porous having pores of a second size that is at least as large as the first size.

6. The fuel cell device of claim 5, wherein the second size is larger than the first size.

7. The fuel cell device of claim 1, wherein the hydrophilic soak up region comprises a hydrophilic material associated with the first gas diffusion layer, the hydrophilic material comprising at least one of carbon or a wettable polymer, wherein the first gas diffusion layer is porous and the hydrophilic material at least partially fills at least some pores of the inlet portion of the first gas diffusion layer.

8. The fuel cell device of claim 7, wherein the hydrophilic material is applied to at least some of the inlet portion of the first gas diffusion layer.

9. The fuel cell device of claim 1, wherein the hydrophilic soak up region remains essentially dry during operation of the fuel cell device.

10. The fuel cell device of claim 1, wherein the hydrophilic soak up region has pores of a first size, and regions of the gas diffusion layer outside the hydrophilic soak up region have pores of a second size that is at least as large as the first size.

11. The fuel cell device of claim 1 wherein the hydrophilic soak up region extends through an entire thickness of the solid, non-porous plate.

12. A method of managing fluid in a fuel cell including a solid, non-porous plate and a gas diffusion layer associated with an electrode assembly, the method comprising:
providing a hydrophilic soak up region within the gas diffusion layer, within the solid, non-porous plate, and near an inlet portion of the gas diffusion layer;
contacting the electrode assembly with the hydrophilic soak up region; and absorbing water directly from the electrode assembly into the hydrophilic soak up region when the fuel cell is shut down.

13. The method of claim 12, wherein the hydrophilic soak up region remains essentially dry during operation of the fuel cell.

14. The method of claim 12, wherein liquid water in the electrode assembly moves into the hydrophilic soak up region when the fuel cell is shut down.

15. The method of claim 12, comprising introducing dry air into at least flow field channels of the non-porous plates when the fuel cell is shut down.

16. The method of claim 12, comprising providing the hydrophilic soak up region on an anode side of the electrode assembly.

17. The method of claim 16, comprising providing the hydrophilic soak up region near an inlet portion of the solid, non-porous plate on the anode side of the electrode assembly.

18. The method of claim 12, comprising providing the hydrophilic soak up region at least partially within an electrochemically inactive area of the gas diffusion layer.

19. The method of claim 12, comprising providing pores in the hydrophilic soak up region having a first size and providing pores on a catalyst layer of the electrode assembly having a second size that is at least as large as the first size.

20. The method of claim 19, wherein the second size is larger than the first size.

21. The method of claim 12, wherein the providing comprises at least one of:

treating a material of the gas diffusion layer with a hydrophilic material comprising at least one of carbon or a wettable polymer; or at least partially filling pores of the gas diffusion layer with a hydrophilic material comprising at least one of carbon or a wettable polymer.

22. The method of claim 12 wherein providing the hydrophilic soak up region comprises providing the hydrophilic soak up region through an entire thickness of the solid, non-porous plate.

* * * * *